United States Patent
Lueh et al.

(10) Patent No.: US 7,367,022 B2
(45) Date of Patent: Apr. 29, 2008

(54) METHODS AND APPARATUS FOR OPTIMIZING THE OPERATING SPEED AND SIZE OF A COMPUTER PROGRAM

(75) Inventors: Guei-Yuan Lueh, San Jose, CA (US); Ali-Reza Adl-Tabatabai, Santa Clara, CA (US); Tatiana Shpeisman, Menlo Park, CA (US)

(73) Assignee: Intel Corporation, Santa Clara, CA (US)

( * ) Notice: Subject to any disclaimer, the term of this patent is extended or adjusted under 35 U.S.C. 154(b) by 944 days.

(21) Appl. No.: 10/235,468

(22) Filed: Sep. 5, 2002

(65) Prior Publication Data

US 2004/0049769 A1  Mar. 11, 2004

(51) Int. Cl.
*G06F 9/45* (2006.01)
*G06F 9/44* (2006.01)

(52) U.S. Cl. .................. 717/151; 717/143; 717/155

(58) Field of Classification Search .......... 717/146, 717/150–158, 136–143, 148–151
See application file for complete search history.

(56) References Cited

U.S. PATENT DOCUMENTS

| | | | | |
|---|---|---|---|---|
| 5,778,233 A * | 7/1998 | Besaw et al. | ............... | 717/154 |
| 6,226,789 B1 * | 5/2001 | Tye et al. | ................... | 717/138 |
| 6,295,644 B1 * | 9/2001 | Hsu et al. | ................... | 717/158 |
| 6,317,872 B1 * | 11/2001 | Gee et al. | ................... | 717/152 |
| 6,397,379 B1 * | 5/2002 | Yates et al. | ................. | 717/140 |
| 6,484,314 B1 * | 11/2002 | Ishizaki et al. | ............ | 717/151 |
| 6,532,531 B1 * | 3/2003 | O'Connor et al. | ......... | 712/202 |
| 6,560,774 B1 * | 5/2003 | Gordon et al. | ............... | 717/146 |
| 6,634,023 B1 * | 10/2003 | Komatsu et al. | ............ | 717/159 |
| 6,701,514 B1 * | 3/2004 | Haswell et al. | ............. | 717/115 |
| 6,851,108 B1 * | 2/2005 | Syme et al. | ................. | 717/146 |
| 6,865,734 B2 * | 3/2005 | Holzle et al. | ............... | 717/153 |
| 6,901,587 B2 * | 5/2005 | Kramskoy et al. | .......... | 717/154 |
| 7,058,929 B2 * | 6/2006 | Charnell et al. | ............ | 717/135 |
| 7,080,366 B2 * | 7/2006 | Kramskoy et al. | .......... | 717/148 |
| 7,111,290 B1 * | 9/2006 | Yates et al. | .................. | 717/158 |
| 7,120,904 B1 * | 10/2006 | Robison | ...................... | 717/155 |
| 7,143,421 B2 * | 11/2006 | Forin et al. | ................. | 719/331 |
| 7,171,655 B2 * | 1/2007 | Gordon et al. | ............. | 717/146 |
| 7,191,433 B2 * | 3/2007 | Narad et al. | ................. | 717/140 |

OTHER PUBLICATIONS

Jiang et al, "An analysis approach for testing exception handling programs", ACM SIGPLAN, vol. 42, 4, pp. 3-8, 2007.*
Ogasawara et al, "A study of exception handling and its dynamic optimization in Java", ACM OOPSLA, pp. 83-95, 2001.*
Lee et al, "Efficient Java exception handling in Just in time compilation", ACM java, pp. 1-8, 2000.*
Chang et al, "Visualization of exception propagation for Java using static analyis", IEEE SCAM, pp. 173-182, 2002.*

* cited by examiner

*Primary Examiner*—Anil Khatri
(74) *Attorney, Agent, or Firm*—Marshall Gerstein & Borun LLP

(57) ABSTRACT

Apparatus and methods for optimizing an operating speed and size of a computer program are disclosed. In an example, an apparatus includes an execution module to run a computer program, an exception detector to detect throws to an exception handler and to detect locations from which the throws occur, a memory to store data developed by the exception detector and a code adjuster to at least one of inline and fold the exception handler with respect to at least one of the detected locations.

20 Claims, 11 Drawing Sheets

416

```
try{
    ...
    if (!file.exists( )) {
        f = new FileNotFoundException;
        goto L:
    }
}catch (FileNotFoundException f) {
    L:
    ...
}
```

```
foo ( ) {
    try  {
        ...
        [bar
            [car
                f = FileNotFoundException;
                Goto L;
            ]
        ]
        ...
        bar ( );
        ...
    }
    catch (FileNotFoundException f)
        {
            L: ...
        }
}
```

METHODS AND APPARATUS FOR OPTIMIZING THE OPERATING SPEED AND SIZE OF A COMPUTER PROGRAM

TECHNICAL FIELD

The present patent relates generally to computers, and more specifically, to methods and apparatus for optimizing the operating speed and size of a computer program.

BACKGROUND ART

Computer programs can experience errors during their execution because of many different reasons, such as human errors in coding the program, unavailability of system resources, etc. Examples of such errors include division of a number by zero, calling of a function with insufficient or wrong parameters, etc. Traditional computer languages handle generation of errors during execution of computer programs by returning error values or error messages. Modem languages such as Java and C++ use exception handling to provide error-handling capacities in computer programs. Since initial creation of the C programming language, considerable research and development of programming languages has produced various exception handling mechanisms. An exception is an abnormal event that disrupts the normal execution of a computer program. Exception handling involves, in essence, a program flow deviation in which alternate processing deals with particular error conditions. When a computer program comes across such an exception, an exception handling routine is invoked. This invoking of an exception handling routine is called "throwing an exception." To invoke an exception handler, a compiler issues a throw statement which identifies an exception type (e.g., file not found). The throw statement is then used to look-up the exception handler. The compiler then redirects program execution to the location of the exception handler identified by the look-up process. This look-up and redirection process is overhead time. Exception handling routines allow programmers to write code that explicitly states what exceptions may be thrown and can be handled. As such, programs that provide exception handling routines are typically more robust and easier to understand than old-fashioned programs that handle errors by returning error values.

There are two commonly used techniques for implementing exception handling upon throwing of an exception. According to one technique, exception throwing is handled by exception tables associated with each function in a program. When an exception is thrown from a location between a set of locations specified in such an exception table, and the exception matches an exception type specified in the exception table, the execution control is transferred to a location also specified in the exception table. Frequently, the code throwing the exception and the code catching the exception are not in the same function or routine of a computer program. Such exceptions are commonly thrown by called functions and they are caught by the caller functions. When stack unwinding is performed during such exception handling, a compiler often cannot do anything to alter the execution of the exception handling process because the necessary code is not available to the compiler in a compiled state (i.e., the code is outside the current compilation scope).

The second technique is to compile the stack unwinding into the native code so as to avoid any run-time overhead. According to this folding technique, the compiler inserts a jump to an exception handler immediately after an instruction throwing an exception. After the exception handler finishes execution, the system continues execution of the code from the location following the exception handler.

As each of these exception handling techniques consumes a considerable amount of processor time, exception throwing should be used only in exceptional cases. However, in reality many programmers use exception throwing as an easy way to change the flow of program control instead of just to handle error events. As a result some of these exception handling routines become hot spots in the program, i.e, such exception handling routines become frequently executed paths and, hence, consume a considerable amount of processing time. The problem of higher processing time along such frequently executed paths becomes more serious when functions are deeply nested. For example when an exception is thrown repeatedly from a function that is deeply nested in a chain of functions calls, the stack unwinding through the entire chain of function calls consumes a considerable amount of processor time as well as other resources such as communications bus bandwidth, memory where the stack has to be unwound, etc.

BRIEF DESCRIPTION OF THE DRAWINGS

FIGS. 5A and 5B are examples of computer code used with the program described in FIG. 4.

FIGS. 7A, 7B and 7C are examples of computer code used with the program shown in FIG. 6.

DESCRIPTION OF THE PREFERRED EXAMPLES

Figure 1:
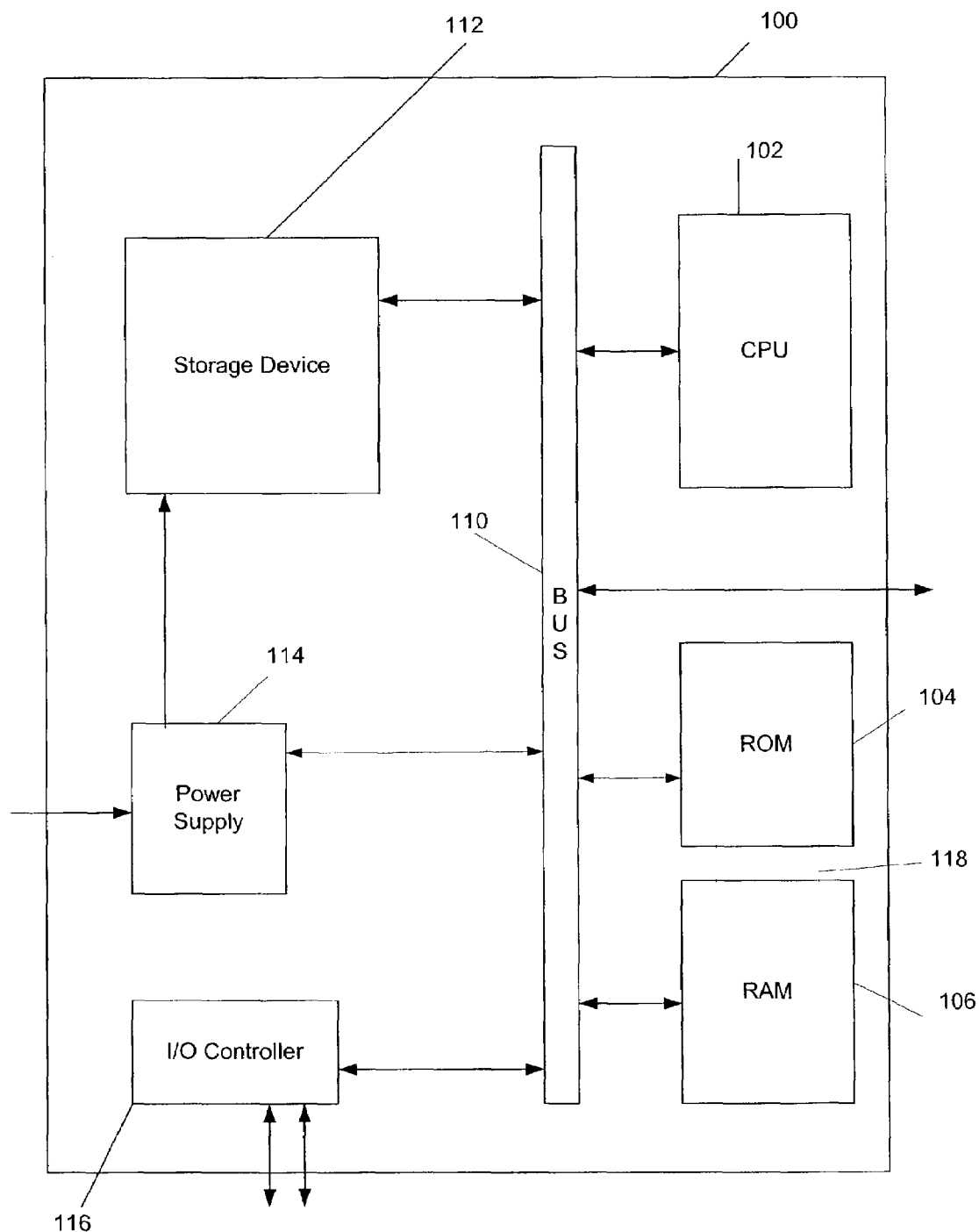
FIG. 1 is a block diagram of an example computer which may be used to execute an example program to optimize the operating speed and the size of a target computer program.

FIG. 1 is a block diagram of an example computer 100. As used herein, the term "computer" refers to any computer (e.g. portable computer, laptop computer, PDA, desktop computer, server, etc.) that employs any type of software to manage exceptions. The computer 100 of the instant example contains many conventional hardware components commonly used in computers. For example, as shown in FIG. 1, the computer 100 includes a central processing unit (CPU) 102, a read only memory (ROM) 104, a random access memory (RAM) 106, a communications bus 110, a storage device 112, a power supply 114 and an input/output (P/O) controller 116. As shown in FIG. 1 at 118 the ROM 104 and/or RAM 106 may contain part(s) of or all of a program to optimize the operating speed and the size of a target computer program. Even though the instant example of the computer 100 shows these components internal to the computer, a person of ordinary skill in the art will appreciate that some of these components can be external to the computer 100.

Figure 2:
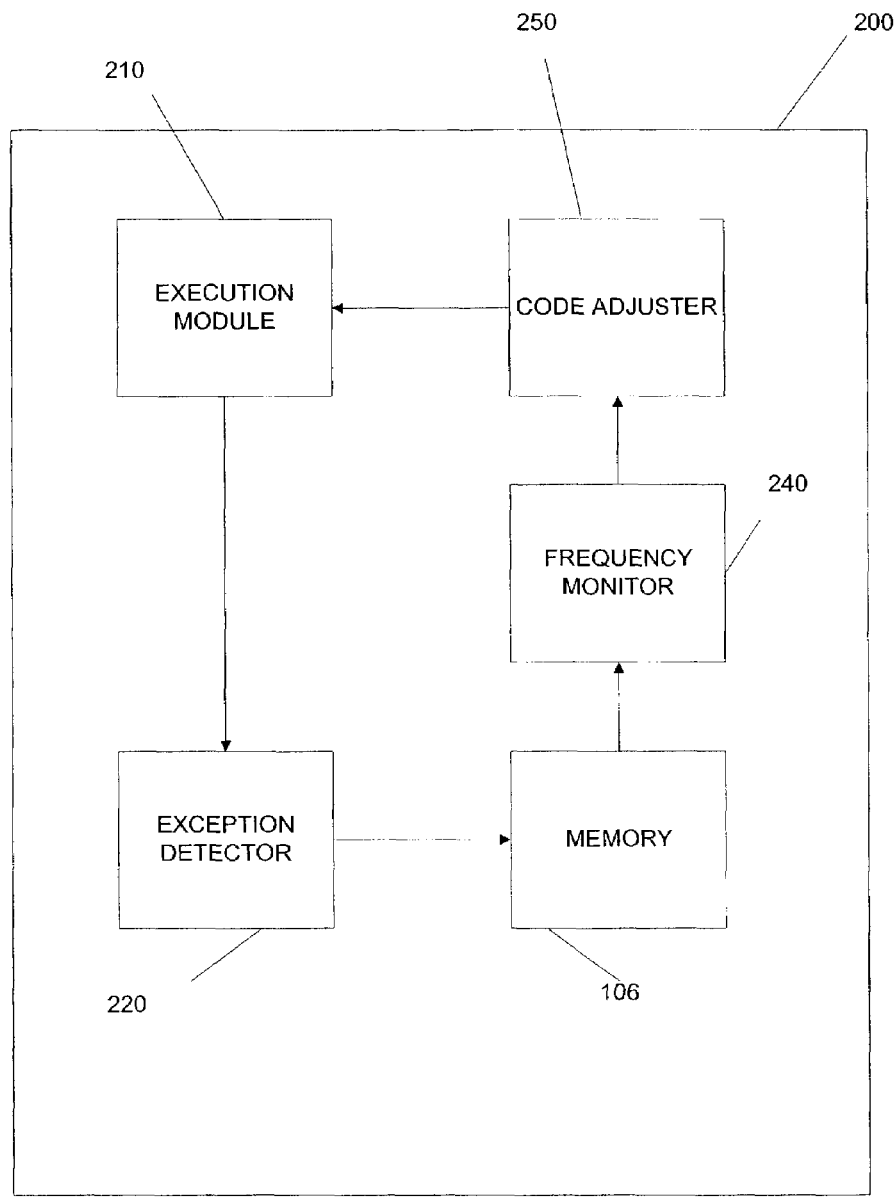
FIG. 2 is a block diagram of an example apparatus to optimize the operating speed and the size of a target computer program.

FIG. 2 is a block diagram of an example apparatus 200 to optimize the operating speed and the size of a target computer program. The illustrated apparatus 200 includes an execution module 210, an exception detector 220, a frequency monitor 240, and a code adjuster 250. The execution module 210 runs the target computer program whose speed and size are to be optimized. The exception detector 220 monitors the target program being executed by the execution module 210 to detect and record any throws to any exception handler. The exception detector 220 also records the location from which any such exception is thrown.

The exception detector 220 records the data it develops in the memory 106. The illustrated memory 106 also contains data regarding various threshold levels.

The frequency monitor 240 analyzes the information in the memory 106 regarding the frequency of throws to exception handlers and their corresponding locations. Using this frequency data and the threshold levels data stored in the memory 106, the frequency monitor 240 identifies instances when inlining and folding should be performed.

The illustrated code adjuster 250 inlines and/or folds an exception handler at a detected location if the exception handler is thrown from the detected location more than a predetermined number of times during a predetermined number of executions of the target computer program. The illustrated code adjuster 250 folds an exception by inserting a first command at the detected location to jump to the exception handler without performing a stack operation. The illustrated code adjuster 250 inlines the exception handler by copying an exception handler into the function that throws the exception to place the throw and the handler within the same compilation scope.

Persons of ordinary skill in the art will readily appreciate that any or all of the execution module 210, the exception detector 220, the frequency monitor 240 and/or the code adjuster 250 can be implemented by hardware, firmware and/or software. However, in the illustrated example, each of these components is implemented by software executing on the CPU 102.

Figure 3A:
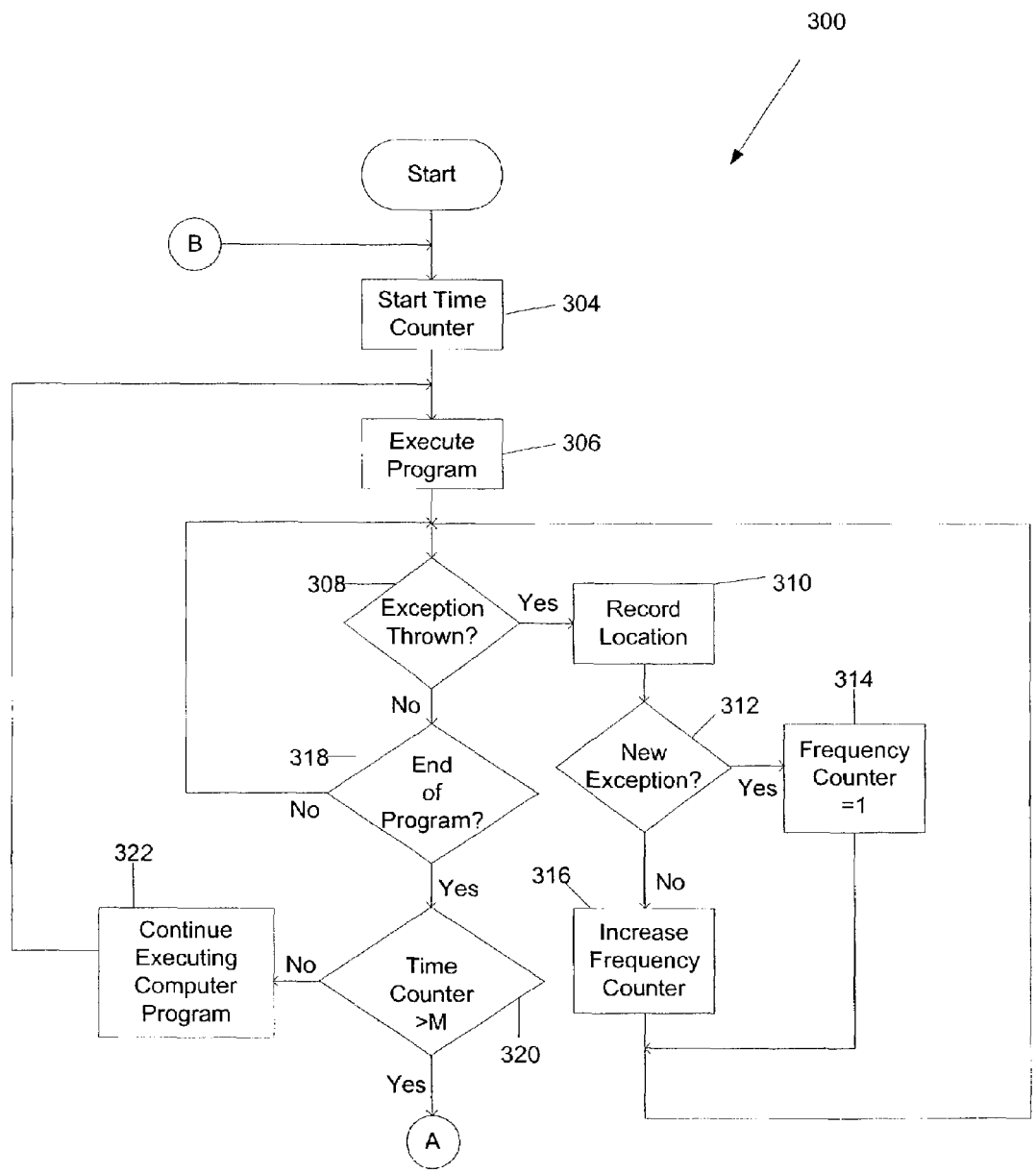
FIGS. 3A and 3B are a flowchart illustrating an example program to optimize the operating speed and the size of a target computer program.
Figure 3B:
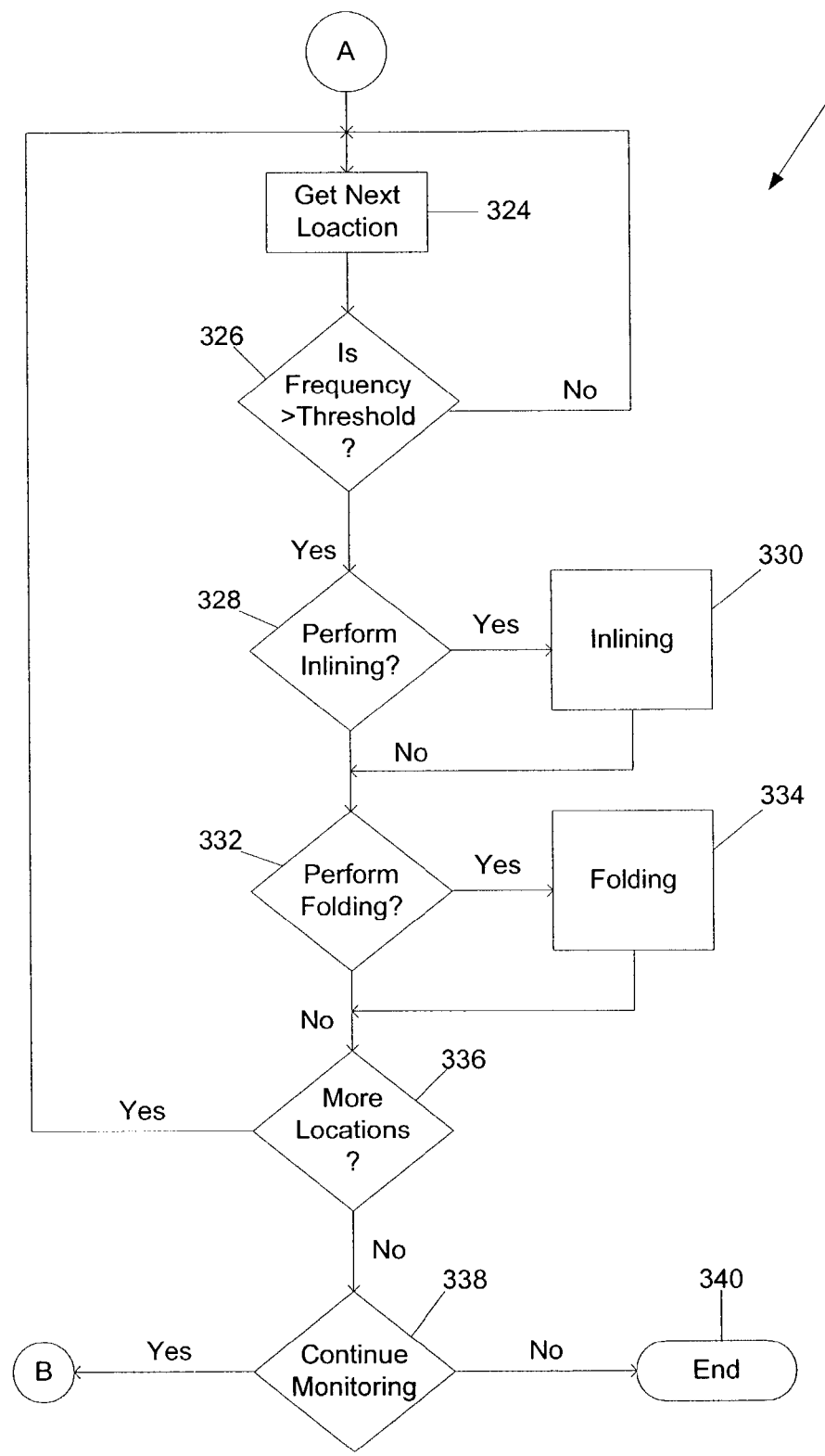

FIGS. 3A-3B are a flowchart illustrating an example software program 300 implementing the apparatus of FIG. 2. Although the program 300 is described with reference to the flowchart illustrated in FIGS. 3A-3B, a person of ordinary skill in the art will readily appreciate that many other methods of performing the acts associated with program 300 may be used. For example, the order of many of the blocks may be changed, and some of the blocks described are optional. Both the program 300 and the target computer program may reside in either the ROM 104 or RAM 106 of the computer illustrated in FIG. 1, or they may be stored on some other computer readable medium, such as a floppy disk, a compact disk, etc. Referring to FIG. 3A, at block 304, the execution module 210 starts an execution counter to count how long the target computer program is executed. At block 306, the execution module 210 starts to execute the target computer program. The target computer program may be written in any programming language such as C, C++, etc., or it may be written in low level computer code such as assembly code. The target computer program may or may not contain one or more exception handling routines to handle exceptions arising during its execution.

The exception detector 220 continuously monitors the execution of the target computer program to see if an exception is thrown, (i.e., whether a call to an exception handling routine is made or not). If an exception is thrown (block 308), the exception detector 220 records the run-time stack trace information from where the exception was thrown (block 310) to the location where the exception is caught. The frequency monitor 240 then determines if the call to an exception handler detected at block 308 and recorded at block 310 was a new call to an exception or one that was recorded previously during the execution of the target computer program (block 312). If the call to an exception handler is determined to be a new call (block 312), the frequency monitor 240 starts a new counter to monitor the frequency of calls to that particular exception handler from that particular location in the target computer program (block 314). If the frequency monitor 240 determines that the call to an exception handler is not a new call during the execution of the target computer program (block 312), it increases the particular counter that was initiated at the first call to that particular exception handler from that particular location to sum the frequency of calls to the exception handler from that location (block 316).

The execution module 210 monitors execution of the target computer program to detect the end of the execution of the target computer program (block 318). At the detection of end of the execution of the target computer program, the execution module 210 compares the value of the time counter that was set at block 304 to a predetermined number (block 320). Such a predetermined number may be stored in the execution module 210 of FIG. 2 or in the memory 106, and it represents the period of time for which the computer program 300 will execute a target computer program to get information about frequency of various exception throws.

If the target program has not executed for the predetermined period of time, the execution module 210 keeps executing the target computer program (block 322). Once the target computer program has executed the predetermined period of time (block 320), the frequency monitor 240 compares the frequency of calls to exception handler from each recorded location in the target computer program with a predetermined threshold.

Specifically, the frequency monitor 240 selects a first location in the target computer program from which an exception throw was recorded (block 324). As noted previously the information about various locations from which calls to exception are thrown is recorded in memory 106. The frequency monitor 240 compares the frequency of calls to an exception handler from each particular location with a predetermined frequency threshold level (block 326). The predetermined threshold level can be a fixed number that may be hard coded in the program 300, or it can be a number that is provided by a user at the initiation of the program 300 and stored in the memory 106. If the frequency of the calls to an exception handler from a given program location is determined to be lower than the predetermined threshold level (block 326), the frequency monitor 240 retrieves the data from the next recorded location that threw an exception (block 324) and compares the frequency of exception calls from that location to the threshold (block 326).

If the frequency of calls to an exception handler from a given program location is determined to be higher than the predetermined threshold level (block 326), at block 328 the code adjuster 250 determines whether it needs to perform one or more inlining operation(s) or not (i.e., whether to copy in a first code section of the target program that calls the exception handler into a second code section that calls the first code section). The decision to perform inlining operation(s) can be made by the code adjuster 250 based on certain predetermined criteria that may be hard-coded in the program 300. For example, one criteria is whether a called exception handler is within the compilation scope. Another criteria may be the size of the functions that are about to be inlined. If an inlining operation is indicated, control passes to block 330. At block 330, the code adjuster 250 performs the inlining operation. An example inlining operation is described below in detail in connection with FIG. 6.

After the completion of the inlining operation (block 330), or if no inlining operation is performed (block 328), control passes to block 332. At block 332, the code adjuster 250 determines whether it needs to perform one or more folding operations or not (i.e., whether to insert a jump command to the handler at the location currently being analyzed to avoid stack unwinding). The decision to perform the folding operation(s) can be made by the code adjuster 250 based on certain predetermined criteria that may be hard coded in the program 300. For example, one such criteria may be the location of the call to an exception handling routine within a given function or computer program being monitored. Another possible criteria is whether the call to an exception is deeply nested, etc. If folding operation(s) are indicated, control passes to block 334. At block 334, the program 300 performs a folding operation. An example folding operation is described in detail below in connection with FIG. 4.

After the completion of the folding operation(s) (block 334), or if no folding operation is performed (block 332), control passes to block 336. At block 336, the code adjuster 250 determines whether there are any more recorded locations that may require inlining and/or folding operation(s). If there are more recorded locations, control passes back to block 324. If all recorded locations have been analyzed, control passes to block 338, where the computer program 300 determines whether to continue monitoring the target program. If continued monitoring is indicated, control passes to block 304. Otherwise execution of program 300 ends (block 340).

Figure 4:
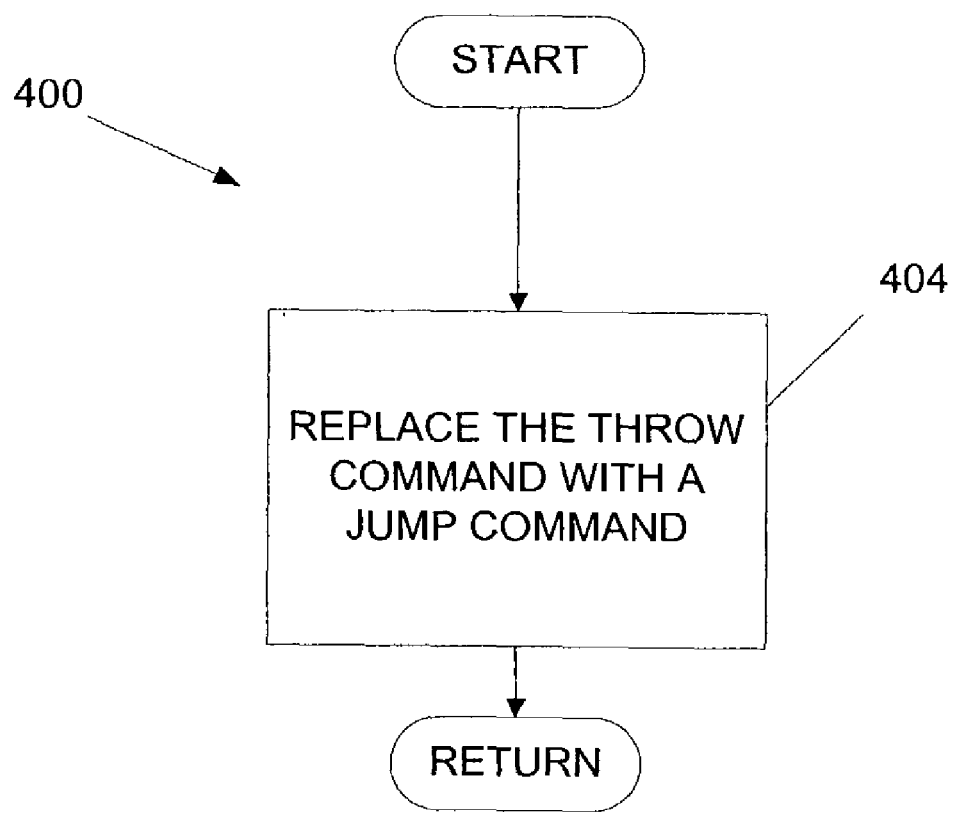
FIG. 4 is a flowchart illustrating an example program to perform the folding operation of the program illustrated in FIGS. 3A-3B.
Figure 5A:
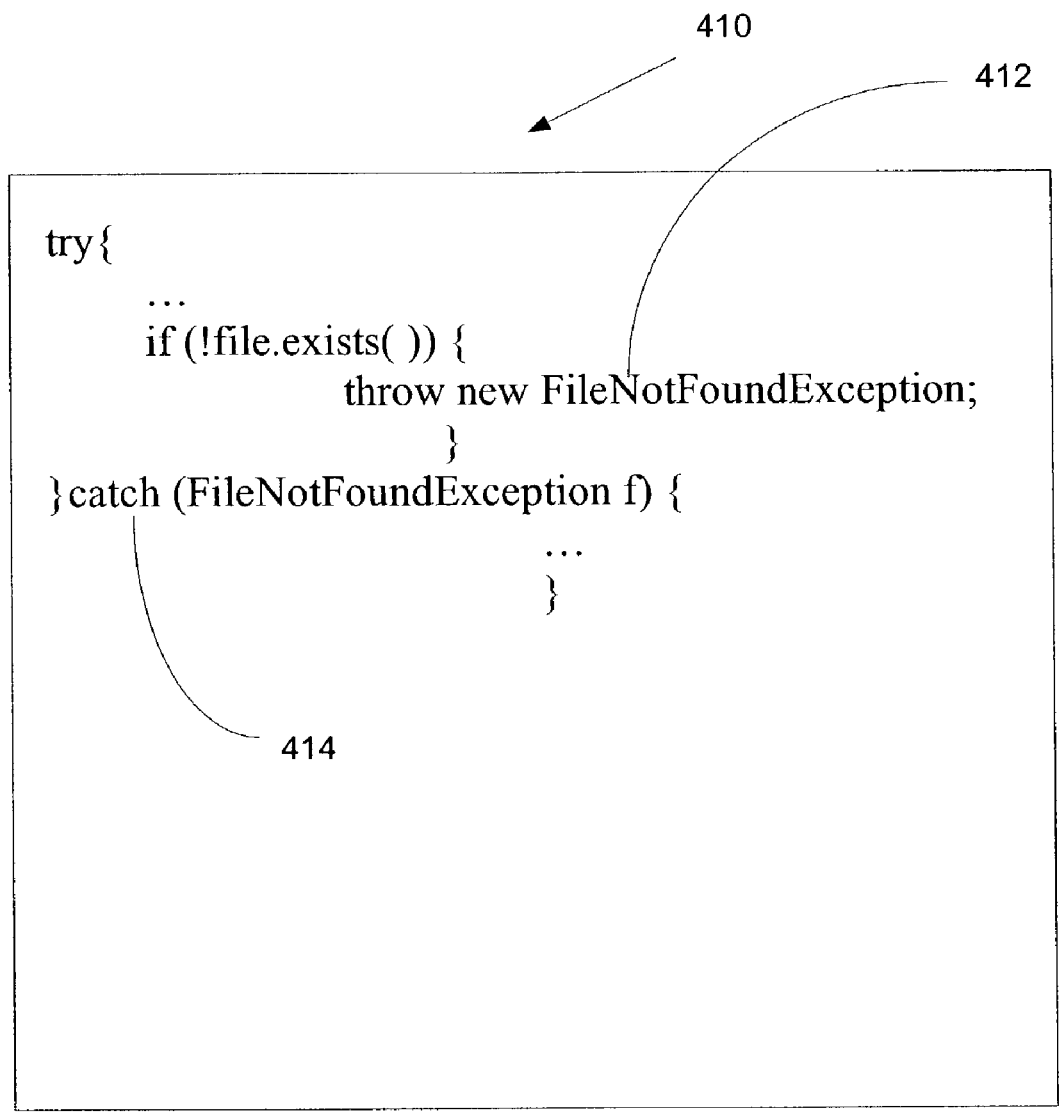

FIG. 4 is a flowchart illustrating an example folding routine 400 performed by the code adjuster 250 of FIG. 2. Folding a function in a computer program is inserting a jump command that transfers control to a given block of code (e.g., an exception handler). At block 404, the program 400 inserts a jump command at the location of the call to an exception handler. The jump command inserted at the block 404 directs the execution of the target computer program to the exception handler. After the exception handler finishes execution, the system continues execution of the code from the location following the exception handler The functioning of the folding routine 400 of FIG. 4 is illustrated by the examples of FIGS. 5A and 5B. FIG. 5A illustrates a prior art Java code fragment 410 that has a try-catch clause. In this prior art example, if the FileNotFoundException is thrown as shown at 412, the catch block 414 catches that exception. The catch block 414 has an exception handling routine FileNotFoundException that handles the exception. The throw statement illustrated in FIG. 5A incurs overhead by requiring the system or compiled code to look up the exception handling routine FileNotFoundException of catch block 414 and to redirect the execution of the target computer program to the exception handling routine FileNotFoundException in block 414. Such overhead could become quite substantial if the throw 412 occurs at higher frequency.

FIG. 5B illustrates the Java code fragment 410 of FIG. 5A modified by performing the folding operation described in FIG. 4 on the code of FIG. 4A. The throw statement is replaced by a jump command 416. In this example, the jump command is implemented by a Goto command 416, but as will be clear to one of ordinary skill in the art, an alternate jump command may also be used. As illustrated in FIG. 5B, the jump command inserted at location 416 transfers the execution of the target program to a location inside the exception handler at 418. Such folding of the exception handling routine reduces the target program overhead, thereby eliminating the requirement for the system or compiled code to look up the exception handling routine FileNotFoundException.

Figure 6:
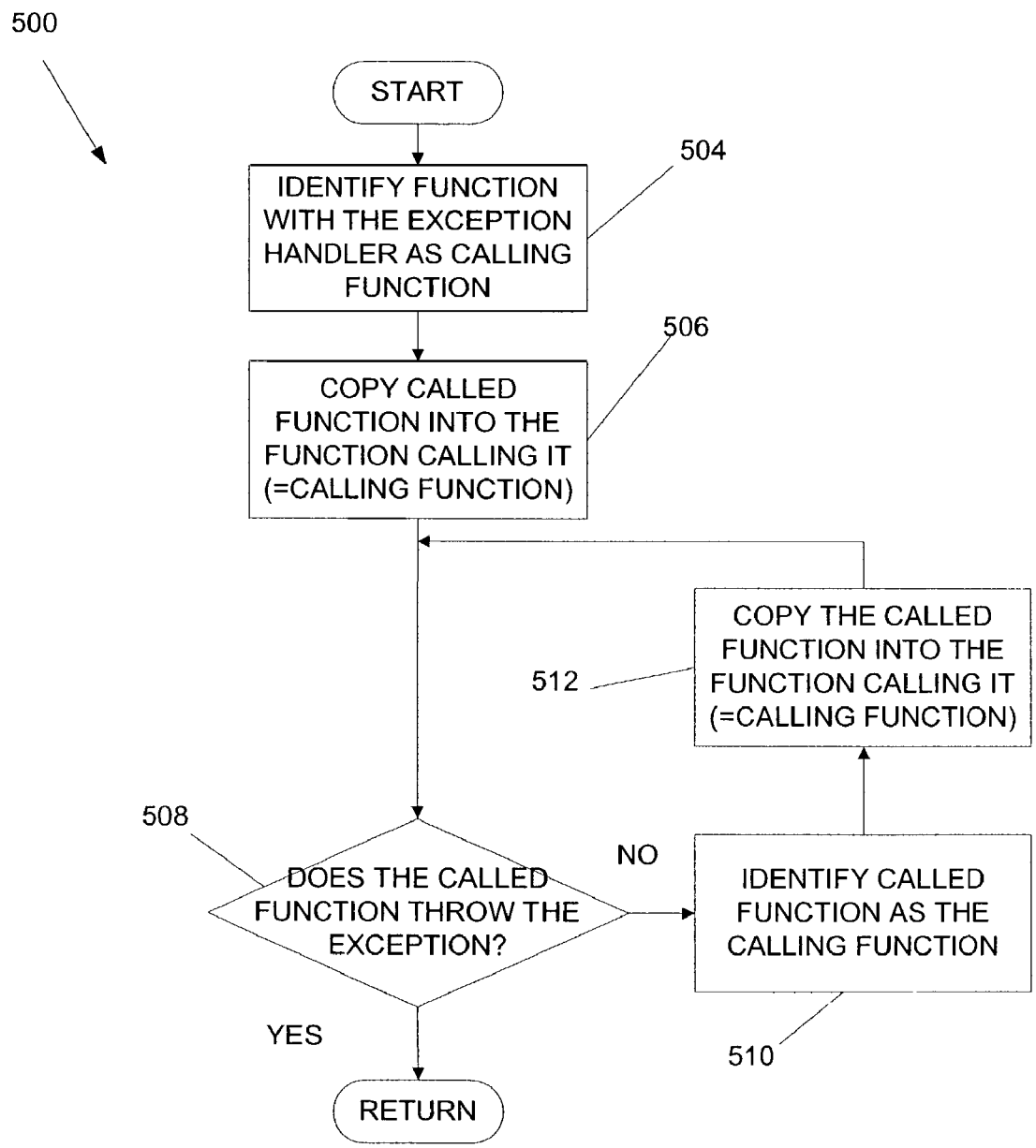
FIG. 6 is a flowchart illustrating an example program to perform the inlining operation of the program illustrated in FIGS. 3A-3B.

FIG. 6 is a flowchart illustrating an example inlining routine 500 executed by the code adjuster 250 to perform the inlining operation on the target program. Inlining a function in a target computer program involves copying the code of a called function (e.g., an exception handler that is not within the current compilation scope) into the calling function. At block 504 the code adjuster 250 identifies the function containing the exception handler (which is named herein the "calling function"). At block 506 the inlining routine 500 copies the code of the function called (which is named herein the "called function") by the calling function into the calling function. At block 508 the code adjuster 250 determines whether the called function is the function from which an exception was thrown. If the called function is not the one from which an exception is thrown, at block 510 the code adjuster 250 identifies the called function as the calling function, and determines the function called by the newly defined calling function as the new called function. At block 512 the code adjuster 250 copies the newly defined called function into the into the newly defined calling function. Next, control passes back to block 508 where the code adjuster 250 determines whether the newly defined called function is the function from which the exception is thrown. At block 508, if the called function is determined to be the one from which the exception is thrown, the inlining operation is complete, the execution of inlining routine 500 ends and control passes back to the program 300 (block 514).

Figure 7A:
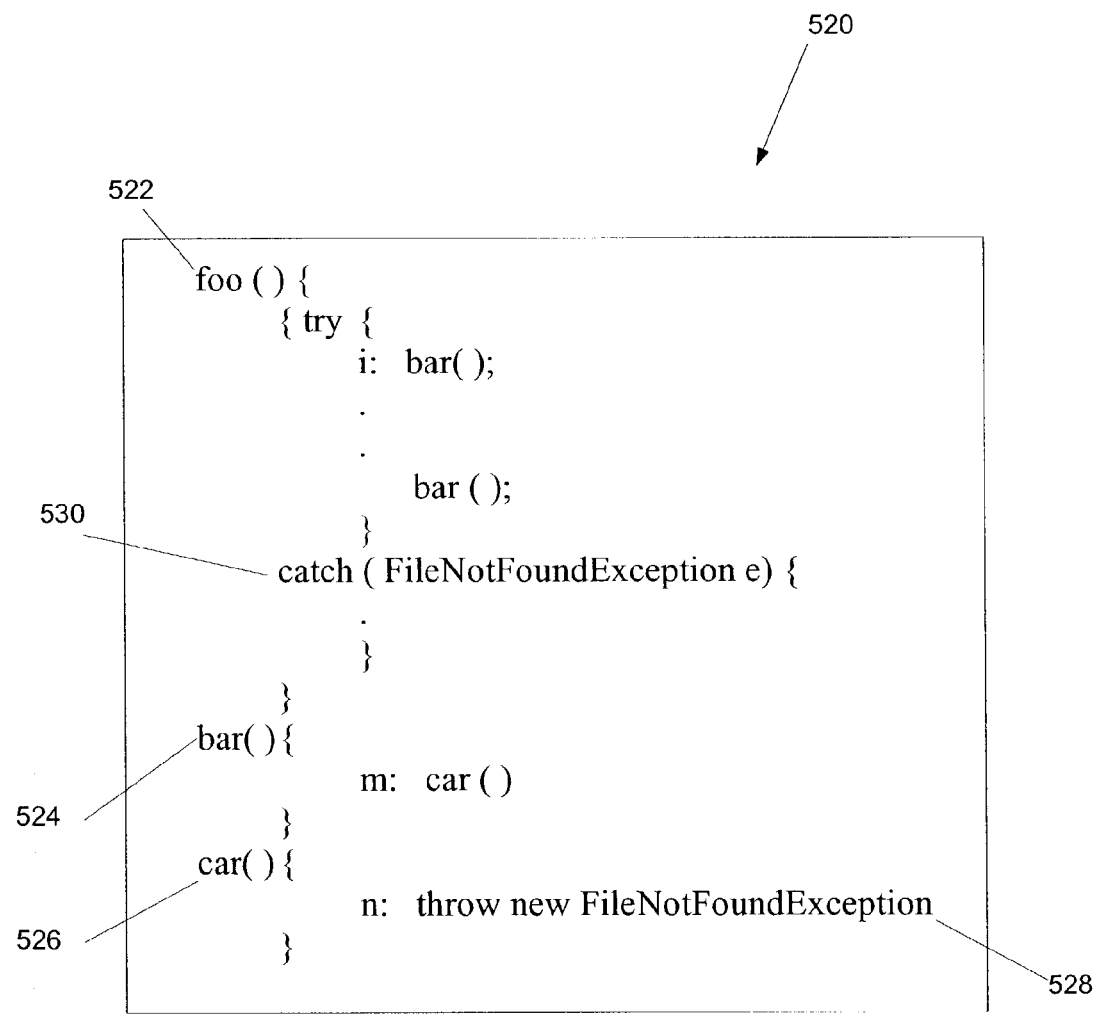
Figure 7B:
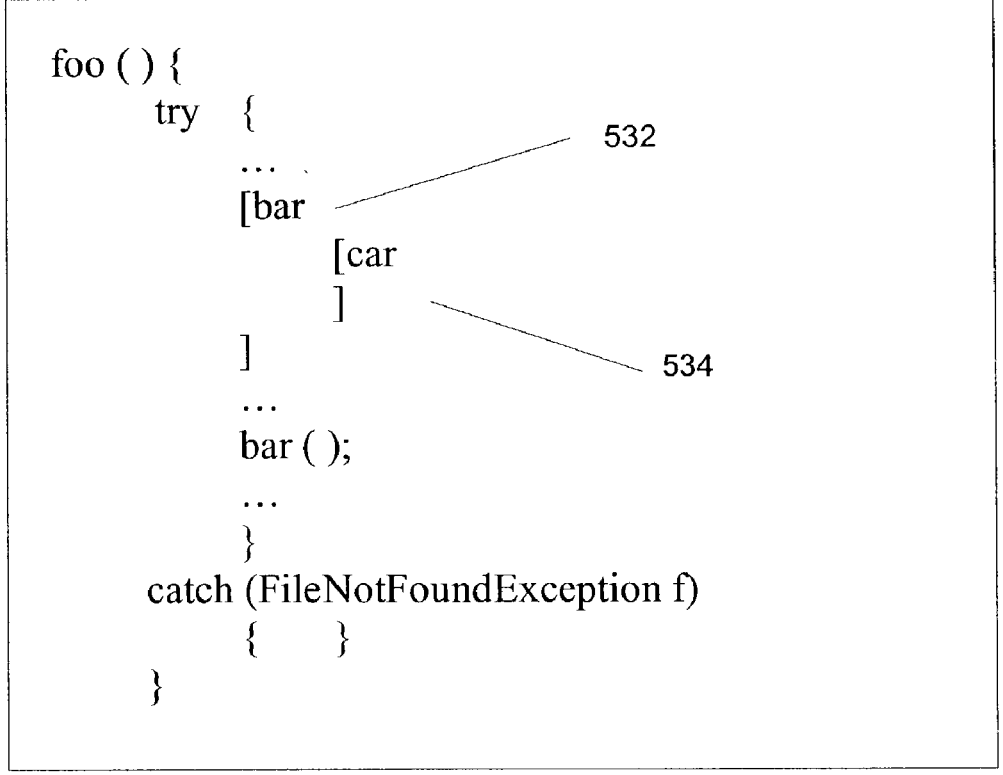

The functioning of the miming routine 500 of FIG. 6 is illustrated by the examples of FIGS. 7A, 7B and 7C. FIG. 7A illustrates a prior art example Java code segment 520 that has three functions foo 522, bar 524 and car 526, where the function car 526 throws an exception called FileNotFoundException at 528. In this prior art example, since the exception handling routine catch 530 is located in the function foo 522, the exception handling path is $foo_i \rightarrow bar_m \rightarrow car_n$. Without inlining, every time an exception is thrown in the function car 526, the stack unwinding involves unwinding the functions car 526, bar 524, and foo 522. Such unwinding process uses a significant amount of system resources. FIG. 7B shows the result of inlining the functions car 526, and bar 524 into the function foo 522 using the miming routine 500 shown in FIG. 6. At block 506 of the inlining routine 500, the called function bar 524 is copied into the calling function foo 522 as shown at 532. At block 508 the code adjuster 250 determines if the called function bar 524 is the function from which an exception is thrown. In the example illustrated in FIG. 7B, this is not the case, so the control passes to block 510 in the inlining routing 500. At block 510, the code adjuster 250 identifies bar 524 as the calling function. At block 512, the code adjuster 250 copies the new called function car 526, into the new calling function bar 524, as shown at 534. At block 508 the code adjuster 250 determines if the called function car 526 is the function from which an exception is thrown. Since in the example illustrated in FIG. 7B, the called function car 526 is the function from which an exception is thrown, as shown at 528, the inlining routine 500 ends at this point and control returns back to the program 300 of FIG. 3 (block 336).

FIG. 7C shows the result of performing both the folding routine 400 and the inlining routine 500 on the illustrated prior art Java code segment 520 of FIG. 7A. At block 404 of the folding routine 400, the code adjuster 250 replaces the call to the exception handling routine at 528 (see FIG. 7A) by a jump command as shown by the Goto command at 538 in FIG. 7C. In this example, the jump command is implemented by a Goto command, but as will be clear to one of ordinary skill in the art, an alternate jump command may also be used.

Although certain apparatus constructed in accordance with the teachings of the invention and certain example methods performed in accordance with the teachings of the invention have been described herein, the scope of coverage of this patent is not limited thereto. On the contrary, this patent covers all embodiments of the teachings of the invention fairly within the scope of the appended claims, either literally or under the doctrine of equivalents.

What is claimed is:

1. A method of optimizing an operating speed and size of a computer program comprising:
   executing the computer program for a period of time;
   recording a location from which an exception handling routine is thrown;
   detecting a frequency with which the exception handling routine is thrown from the recorded location;
   comparing the detected frequency with which the exception handling routine is thrown from the recorded location with a predetermined threshold;
   if the frequency exceeds the predetermined threshold, performing at least one of folding and inlining of the exception handling routine; and
   wherein inlining the exception handling routine comprises identifying a first function from which the exception handling routine is thrown and copying the first function into a final function which contains the exception handling routine.

2. A method defined in claim 1 wherein inlining the exception handling routine comprises:
   copying the first function into a second function calling the first function and copying the resulting second function into a final function which contains the exception handling routine.

3. A method as defined in claim 1 wherein folding comprises inserting a first command at the recorded location to jump to the exception handling routine without performing a stack operation.

4. A method as defined in claim 1 wherein folding comprises inserting a first command at the recorded location to jump to the exception handling routine without performing a stack operation.

5. An apparatus for optimizing a size and operating speed of a computer program comprising:
   an execution module to run the computer program at least during a first predetermined period and a second predetermined period;
   an exception detector to detect throws to an exception handler and to detect locations from which the throws occur;
   a memory to store data developed by the exception detector;
   a code adjuster to at least one of inline and fold the exception handler with respect to at least one of the detected locations that throws the exception handler more than a first predetermined number of times during the second predetermined period of execution of the computer program; and
   a frequency monitor to determine if the exception handler is thrown from any of the detected locations more than the first predetermined number of times during the second predetermined period of execution of the computer program, wherein the code adjuster inlines or folds the exception handler with respect to the detected location only if the e exception handler is thrown from any of the detected locations more than the first predetermined number of times during the second predetermined period of execution of the computer program.

6. An apparatus as defined in claim 5 wherein the code adjuster folds the exception handler by inserting a first command at the detected location to jump to the exception handler without performing a stack operation.

7. An apparatus as defined in claim 6 wherein the code adjuster folds the exception handler by inserting a second command at the detected location to jump to a location immediately following the first command without performing a stack operation.

8. A method for optimizing a size and operating speed of a computer program comprising:
   executing the computer program a first period of time;
   detecting throws to an exception handler and locations from which the throws occur;
   comparing the detected frequency with which the exception handling routine is thrown from the recorded location with a predetermined threshold; and
   at least one of inlining and folding the exception handler with respect to the detected locations that throw the exception handler more than a predetermined number of times during the first period of execution of the computer program, wherein inlining the exception handling routine comprises identifying a first function from which the exception handling routine is thrown and copying the first function into a final function which contains the exception handling routine.

9. A system for optimizing processor operation comprising:
   a processor;
   a memory coupled to the processor for storing software for execution by the processor;
   wherein the memory stores a compiler program to handle a first predetermined condition in a computer program, where the computer program comprises a first function that generates the first predetermined condition, an intermediate function, and a final function with a catcher routine for handling the first predetermined condition, where upon generation of the first predetermined condition, the first function transfers the execution of the computer program to the intermediate function, which transfers the execution of the computer program to the final function, the compiler program comprising:
   first software to detect generation of the first predetermined condition in the first function;
   second software to identify the intermediate function and the final function involved in handling the first predetermined condition and to determine an order in which the execution of the computer program transfers from the first function to the final function upon generation of the first predetermined condition;
   third software to copy the first function into the intermediate function and to copy the resulting intermediate function into the final function;
   fourth software to remove a throw statement from the first function; and fifth software structured to insert a catching position in the catcher routine at the end of the final function and to replace a call to the catcher routine for handling the first predetermined condition from the first function with a jump statement that transfers execution of the computer program to the catching position in the catcher routine.

10. The system of claim 9, wherein the first predetermined condition of the compiler program stored in the memory is an exception.

11. The system of claim 9, wherein the compiler program stored in the memory further comprises sixth software to measure frequency of generation of the first predetermined condition.

12. The system of claim 11, wherein the third, fourth and fifth software of the compiler program stored in the memory are executed only if the measured frequency of generation of the first predetermined condition in the first function is higher than a predetermined threshold.

13. The system of claim 12, wherein the compiler program stored in the memory recompiles the computer program.

14. The system of claim 9, wherein at least one of the first, second, third, fourth and fifth software of the compiler program stored in the memory comprises firmware.

15. The system of claim 9, wherein the computer program stored in the memory is written in at least one of C, C++ and Java.

16. A method of optimizing processor operation comprising:
providing a processor and a memory coupled to the processor for storing software for execution by the processor;
storing in the memory a first computer program that includes a first function that generates a first predetermined condition, an intermediate function, and a final function with a routine for handling the first predetermined condition, where upon generation of the first predetermined condition, the first function transfers the execution of the computer program to the intermediate function, which transfers the execution of the computer program to the final function;
executing a second computer program that,
detects generation of the first predetermined condition, identifies the intermediate function and the final function involved in handling the first predetermined condition and determining an order in which the execution of the computer program transfers from the first function to the final function upon generation of the first predetermined conditions,
copies the final function into the intermediate function and copying the resulting intermediate function into the first function,
removes a throw statement from the first function and the intermediate function,
inserts a catcher routine at the end of the first function, and
replaces the routine for handling the predetermined condition from the final function with a jump statement that transfers execution of the computer program to the catcher routine.

17. A method as defined in claim 16 wherein the first predetermined condition is an exception.

18. A method as defined in claim 16 further comprising measuring the frequency of generation of the first predetermined condition.

19. The method as defined in claim 18 wherein copying the final and intermediate functions, removing the throw statement and inserting the catcher routine are performed when the frequency of the generation of the first predetermined condition is above a predetermined threshold.

20. The method as defined in claim 19 further comprising recompiling the computer program.

* * * * *

UNITED STATES PATENT AND TRADEMARK OFFICE
CERTIFICATE OF CORRECTION

| | | |
|---|---|---|
| PATENT NO. | : 7,367,022 B2 | Page 1 of 1 |
| APPLICATION NO. | : 10/235468 | |
| DATED | : April 29, 2008 | |
| INVENTOR(S) | : Guei-Yuan Lueh et al. | |

It is certified that error appears in the above-identified patent and that said Letters Patent is hereby corrected as shown below:

On the Title Page:

Item (74), "Marshall" should be -- Marshall, --.

In the Claims:

At Column 8, line 6, "the e" should be -- the --.

Signed and Sealed this

Sixteenth Day of September, 2008

JON W. DUDAS
*Director of the United States Patent and Trademark Office*